United States Patent
Mathieu et al.

[11] Patent Number: 5,980,255
[45] Date of Patent: Nov. 9, 1999

[54] SEAT FOR MOTION SIMULATOR AND METHOD OF MOTION SIMULATION

[75] Inventors: Louis-Joseph Mathieu, Montreal; Pascal Le-Huu, Rimouski, both of Canada

[73] Assignee: Cae Electronics Ltd., Quebec, Canada

[21] Appl. No.: 09/039,245

[22] Filed: Mar. 16, 1998

[51] Int. Cl.$^6$ .............................. G09B 9/00; A63G 31/16
[52] U.S. Cl. .................... 434/30; 434/29; 472/59
[58] Field of Search .................. 434/30, 29, 38, 434/45, 55, 62, 69; 472/59, 130

[56] References Cited

U.S. PATENT DOCUMENTS

| | | | |
|---|---|---|---|
| 3,158,398 | 11/1964 | Stryker | 297/333 |
| 3,270,440 | 9/1966 | Radosevic, Jr. | 434/59 |
| 3,309,795 | 3/1967 | Helmore | 434/59 |
| 3,597,857 | 8/1971 | Akister | 35/12 |
| 3,628,829 | 12/1971 | Heilig | 297/217.4 |
| 3,720,007 | 3/1973 | McKechnie et al. | 434/43 |
| 3,734,613 | 5/1973 | Harpe et al. | 355/47 |
| 3,983,640 | 10/1976 | Cardullo et al. | 434/59 |
| 4,030,207 | 6/1977 | Kron | 434/59 |
| 4,059,909 | 11/1977 | Kron | . |
| 4,264,310 | 4/1981 | Ashworth et al. | . |
| 4,321,044 | 3/1982 | Kron | 434/59 |
| 4,576,577 | 3/1986 | Lam et al. | 434/58 |
| 4,710,128 | 12/1987 | Wachsmuth et al. | 434/46 |
| 4,879,849 | 11/1989 | Hollingsworth, III et al. | 52/10 |
| 5,240,416 | 8/1993 | Bennington | 434/30 |
| 5,431,569 | 7/1995 | Simpkins et al. | 434/29 |
| 5,437,453 | 8/1995 | Hineman | 273/148 |
| 5,678,889 | 10/1997 | Purcell, Jr. | 297/257 |

*Primary Examiner*—Paul J. Hirsch
*Assistant Examiner*—Michael B. Priddy

[57] ABSTRACT

A new motion cueing scheme has been found and adapted to an actual aircraft production seat to provide both transient and sustained heave acceleration cues. The mechanism is simple and compact enough to be easily implemented on G-seats. Changes in seat pan pitch angle synchronized with seat back vertical displacement result in a cue which feels realistic and reproduces consistently a number of the physiological and physical effects experienced by the pilot submitted to a real heave acceleration.

10 Claims, 3 Drawing Sheets

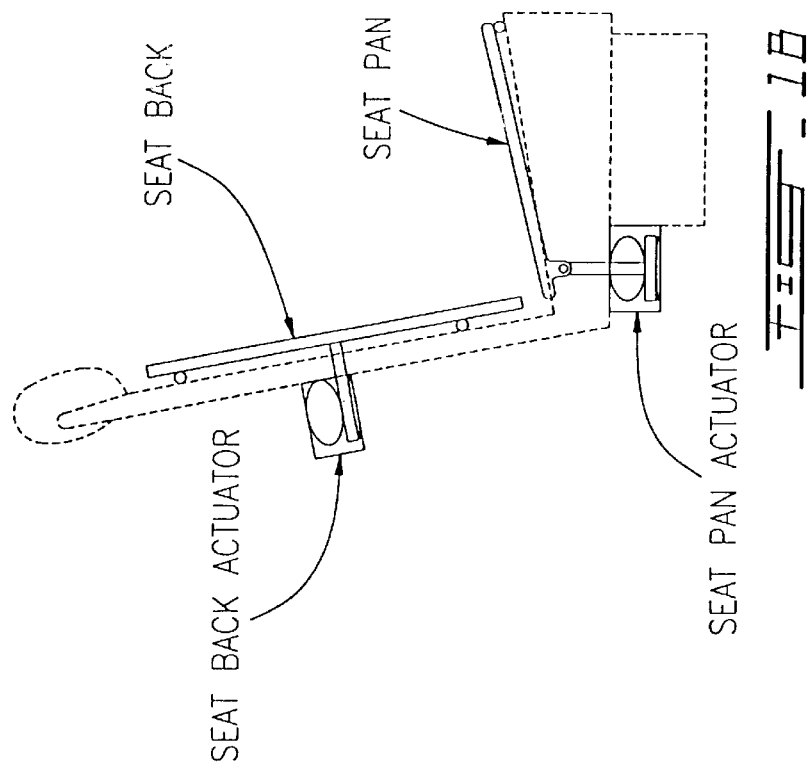
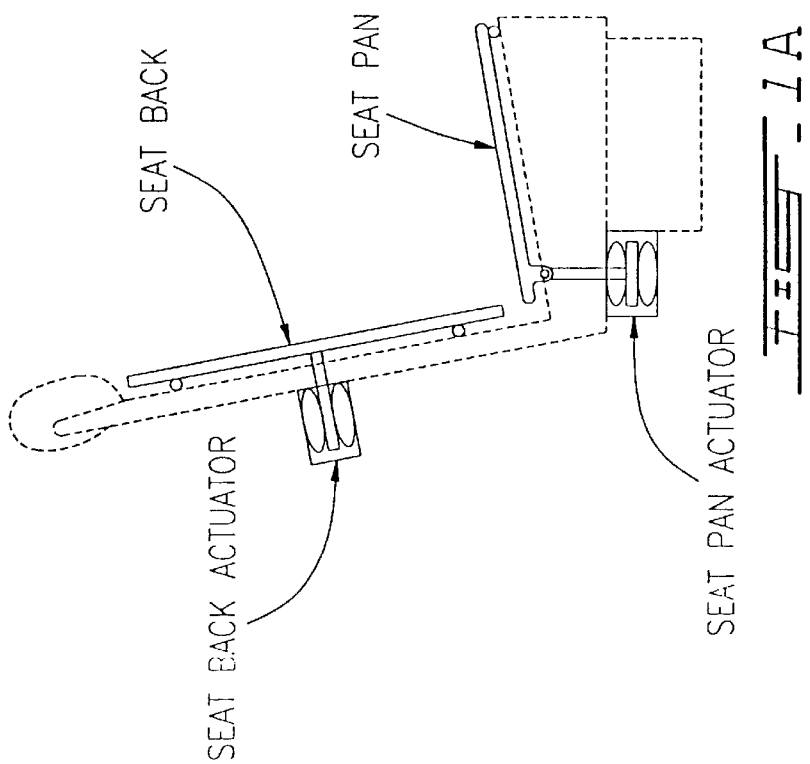

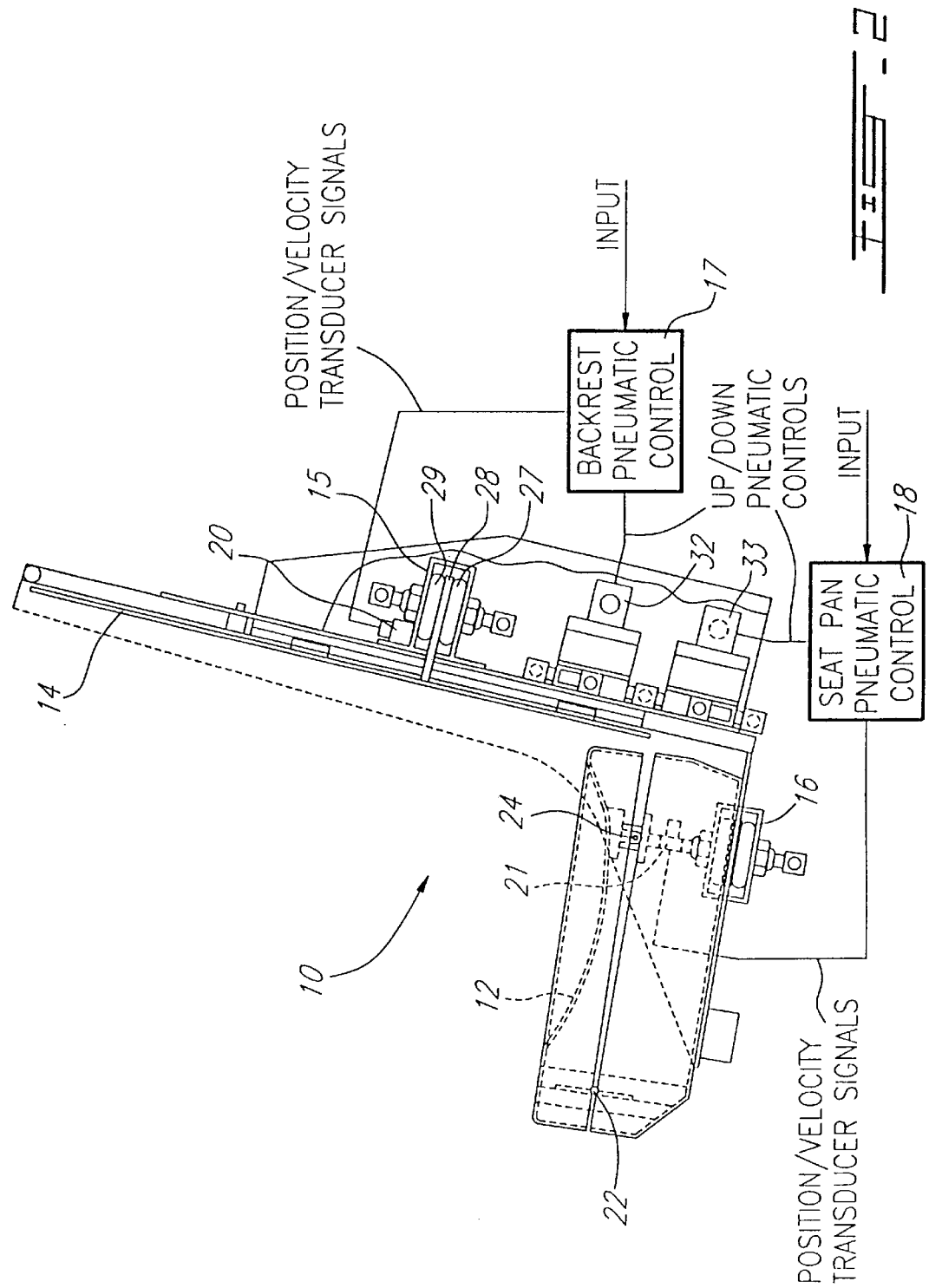

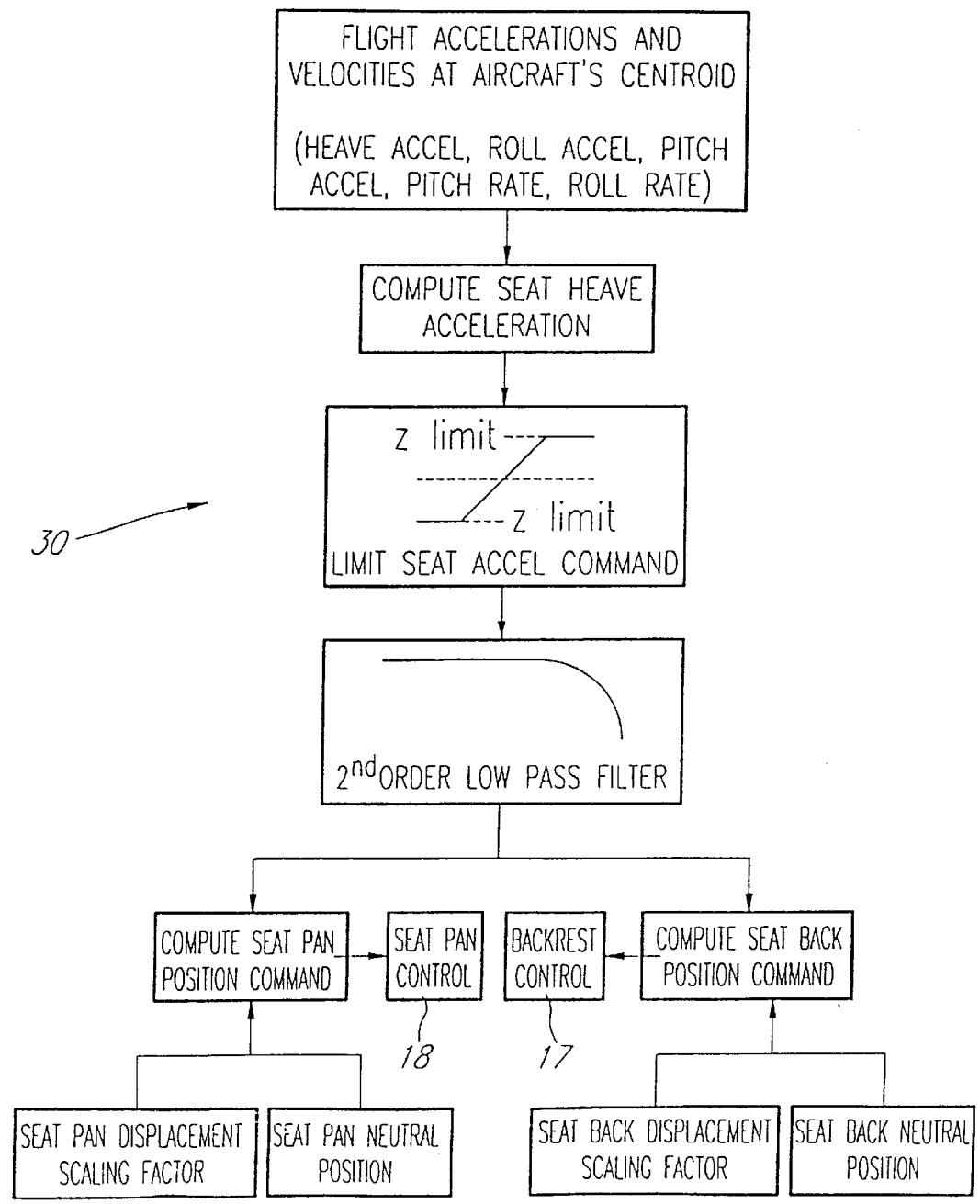

SEAT FOR MOTION SIMULATOR AND METHOD OF MOTION SIMULATION

FIELD OF THE INVENTION

The present invention relates to a seat for a motion simulator, such as a flight simulator, in which tactile cues are provided by the seat to a person sitting in the seat to induce an illusory sensation of acceleration. The invention also relates to a method of motion simulation involving a combined vertical movement of a seat pan and back support.

BACKGROUND OF THE INVENTION

Flight motion simulator seats having controls for shifting body position and pressure exerted are known in the art. U.S. Pat. No. 3,270,440 to Radosevic is an early example of a pneumatically controlled flight simulation seat which simulates the tactile sensations that would be felt by a pilot during flight. The seat pneumatic controls are connected to the flight simulation computer so as to provide realistic sensations which correspond to the flight situation being simulated. U.S. Pat. No. 3,983,640 to Cardullo et al. is an early example of a modern style aircraft simulator seat.

A human being subjected to accelerations will perceive movement from different indications coming from his sensory system, the main one being the vestibular system, on which the conventional motion platforms act. G-seats or dynamic seats act on alternative sensory paths which are mainly visual perspective changes, and changes from the sensory system referred as the haptic system by Cardullo. As described in U.S. Pat. No. 3,983,640, changes in the following items are perceived by the haptic sensory system: skeletal attitude, muscle tonus, pressure gradients, and touch or area of contact. Skin tension, amongst others, could be added to this list. Since most of the seats act on the same sensory paths to create the illusion of acceleration, conventional seats are differentiated by the sensory path they emphasize and by how the various sensory paths are combined with each other. Another important aspect in the evaluation of dynamic seats is side effects that can be created, while trying to stimulate a specific sensory path. For example, a device could generate an eye height change which would correspond to an upwards acceleration and generate a gradient of pressure that would correspond to a downwards acceleration as a side effect.

U.S. Pat. No. 4,030,207 to Kron discloses a simulator "G-seat" including a skin tension cue generator in which the seat fabric may be displaced in a parallel direction to the cushion surface onto which it is installed, and all or part of the seat pan may move from side to side and front to back. The tactile cue in Kron is a skin tension change for which the amplitude can be modulated and localized on specific parts of the body, in the seat back and pan areas. In Kron, the backrest skin tension change is meant to occur in the lateral direction but not in the vertical direction.

In the prior art simulator seats, heave(vertical) acceleration was simulated by a seat pan vertical movement which induces at the same time "back scrubbing"(i.e., tension change on the skin of the user's back) due to the back rest remaining vertically stationary. Therefore, the amount of back scrubbing generated is not controlled. Applicants have discovered that a pitch movement of the seat pan coordinated with a the back rest vertical displacement, which is to be described in the present document, generates cues on the haptic sensory system along with an eye height change which provide realistic heave acceleration cues.

SUMMARY OF THE INVENTION

It is an object of the present invention to provide a motion simulator seat in which pitch seat pan movement is coordinated with seat back movement in order to provide sustained vertical (i.e. heave) acceleration simulation with minimal side effects.

According to the invention, there is provided a motion simulator seat comprising seat pan pitch angle adjustment means and seat back vertical position adjustment means. The movement of the seat pan and seat back are controlled in response to the heave acceleration of the simulated vehicle. The pitch movement of the seat pan stimulates several sensory paths in a manner which is very consistent with the physiological effects caused by an acceleration. To help understand its principle of operation, a description of how the pitch movement will simulate an upwards acceleration is now given. The part of the seat pan which is nearest to the backrest (back part) will rotate about a pivot point which is located on the region of the seat pan which is farthest from the back rest (front part), in such a way that the back part of the seat pan will lower. This will lower the eye height of the occupant and change his visual perspective. In the meantime, the angles of the arms and legs of the occupant will change with respect to the trunk, and the ischial bone will tilt. This skeletal attitude change will result in a change in muscle tone, an increase of pressure on the ischial tuberosities region, in the back of the knee region and also in the lower back region. Meanwhile the contact area will be augmented in the back of the knee and lower back region. Also the lap belt tension will be decreased. The above mentioned effects are all consistent with the physiological effects caused by an upwards acceleration.

A change in the seat pan pitch angle with the seat back remaining stationary would naturally create back scrubbing, which might result in an unrealistic cue if its amplitude is either too big or too small. Therefore, the seat back adjustment means operate to provide an adjusted or controlled amount of back scrubbing. The moving back panel also allows to push and pull the occupant onto and out of the seat pan, therefore enhancing pressure gradient on the seat and on the lower back region. As explained above, a well synchronized and properly adjusted movement of the seat back and seat pan result in a cue which feels realistic and reproduces consistently a fair number of the effects experienced by the pilot submitted to a real heave acceleration.

BRIEF DESCRIPTION OF THE DRAWING

The invention will be better understood by way of the following description of a preferred embodiment of the invention with reference to the appended drawings, in which:

FIGS. 1A and 1B show a side view of the seat components during simulation of an upward acceleration;

FIG. 2 is a partly section side view of the helicopter simulator seat according to the preferred embodiment; and FIG. 3 is a block diagram of the helicopter simulator seat position control system according to the preferred embodiment.

DETAILED DESCRIPTION OF THE PREFERRED EMBODIMENT

As shown in FIG. 1, the dynamic seat system 10 according to the preferred embodiment includes a seat pan support 12, a seat back support 14, a pneumatic actuator 15 for moving the seat back 14 and a pneumatic actuator 16 for moving the seat pan 12. The system 10 may used in a helicopter simulator and other types of motion simulators. The seat pan cushion and the backrest cushion are not illustrated in FIG. 1. The seat pan 12 is connected to the pneumatic actuator 16 by a pivot joint 24 near a rear of the seat pan while a pivot joint 22 is provided at a front of the seat pan. Pneumatic control units 17 and 18 are provided for the backrest and seat pan respectively and include position and velocity transducer assemblies 20 and 21 respectively for providing position and velocity feedback signals to the controls 17 and 18.

The construction of the position actuators 15 and 16 are shown schematically in FIGS. 1A and 1B. A first balloon or pneumatic bladder 27 is sandwiched between a base plate of the actuator 15 and a mobile middle plate 28 which is connected to the seat back mobile plate 14. In the case of the actuator 16, the middle plate is connected to a rigid assembly connected to the pivot joint 24. Between the middle plate 28 and an upper plate of the pneumatic unit 15, there is provided a second balloon or bladder 29. Pressurized air is connected to both balloons 27 and 29 using a pneumatic 4-way servo-valve, in which each one of the two output ports is connected with one of the bladders, in order to provide a rapid response in movement of the middle plate 28 by controllably inflating and deflating the inflatable balloons 27 and 29. The range of movement is approximately 2 cm. While there is shown in FIG. 1 a single pneumatic actuator 15 and 16, it is possible to provide two or more such actuators for each of the backrest and the seat pan in order to improve performance.

The pneumatic controls 17 and 18 comprise pneumatic solenoid valves 32 and 33, respectively, for controlling movement as well as other components of the pneumatic circuit, such as a connection to a source of pressurized air, air filters and mufflers on the return air path in order to provide for quiet operation. For clarity of illustration in the drawings, the hose connections between the solenoid valves and the other components of the pneumatic circuit are not shown. The controls 17 and 18 also include electronic controls for reading the input position signals and controlling the pneumatic solenoid valves as a function of the position and velocity transducer signals returned from the transducer assemblies 20 and 21 respectively.

As illustrated in FIG. 2, the vertical position adjustment systems for the seat pan and the seat back include a seat pan and seat back calculation system 30 for providing the seat pan and backrest position signals to the seat pan pneumatic control 18 and the backrest pneumatic control 17. In the preferred embodiment, the dynamic seat system 10 is used in a helicopter simulator, and the flight accelerations and velocities are calculated by a simulation computer for the aircraft's centroid. Data signals representing the flight accelerations and velocities are sent to the system 30 where the dynamic seat heave acceleration is calculated for the particular dynamic seat being controlled. In a helicopter, there may be a pilot seat and an observer seat in the simulator.

The seat heave acceleration value goes through two filtering stages, namely, the seat heave acceleration value is cut off above and beyond limit values, and then the seat heave acceleration values are passed through a second order low pass filter which eliminates acceleration changes above a certain frequency. The limit values and the second order low pass filter cutoff frequency value are preferably determined by system constraints, such as the type of simulation and the frequency response characteristics of the dynamic seat, and selection of appropriate values will be readily apparent to those skilled in the art. The heave acceleration value is then individually converted into a seat pan and back rest position command, using knowledge of the actuator neutral position and displacement factor. In the preferred embodiment, the linear relationship between acceleration and seat pan and backrest movement are close to one another, although the backrest will undergo movement which is slightly more than the movement of the seat pan.

The range of movement in centimeters for the seat pan in the preferred embodiment is 2 cm and for the backrest is 2 cm. The output of such computation for the seat pan position command value is fed to the seat pan pneumatic control 18 and likewise, the computation of the backrest position command value is fed to the backrest pneumatic control 17.

The displacement scaling factor and neutral position values for the seat pan and backrest are parameter values which can be adjusted individually.

While in the preferred embodiment it is contemplated to control the seat back movement and the seat pan movement independently using separate control systems responding to the heave acceleration value, it would also be possible to provide a mechanical linkage between the seat pan and seat back either in such a way that the two undergo the same displacement or the seat back could undergo a predetermined fraction of the seat pan movement.

Although the invention has been described above with reference to a preferred embodiment, it is to be understood that the above description is intended merely to illustrate the invention and not to limit the scope of the invention as defined in the appended claims.

What is claimed is:

1. A motion simulator seat having a seat pan and seat back, said seat comprising:

a seat pan pitch angle adjustment motor mechanism adjusting a pitch angle of the seat pan while moving a rear of the seat pan vertically, and a seat pan motor mechanism controller responsive to a heave acceleration control signal; and seat back vertical position adjustment motor mechanism adjusting a vertical position of the seat back along a substantially vertical, linear path and a seat back motor mechanism controller responsive to a heave acceleration control signal, wherein changes in a difference between said seat back vertical position and said seat pan pitch angle create back scrubbing, and said seat pan motor mechanism controller and said seat back motor mechanism controller operate to provide an adjusted amount of said back scrubbing.

2. The seat as claimed in claim 1, wherein said pitch angle of said seat pan adjusted by said seat pan pitch angle adjustment motor mechanism is at a rear of said seat pan, and said seat pan remains vertically fixed at a front pivot joint thereof.

3. The seat as claimed in claim 1, wherein said seat pan motor mechanism controller and said seat back vertical position motor mechanism controller operate independently of one another, and said pitch angle of said seat pan and said vertical position of said seat back undergo different changes in response to changes in said heave acceleration control signal.

4. The seat as claimed in claim 1, further comprising a second order low pass filter means for filtering said heave acceleration control signal prior to use by said seat pan motor mechanism controller and said seat back motor mechanism controller.

5. The seat as claimed in claim 1, wherein said seat pan pitch angle adjustment motor mechanism and said seat back vertical position adjustment motor mechanism comprise up/down bladder pair assemblies.

6. The seat as claimed in claim 5, wherein said seat pan motor mechanism controller and said seat back motor mechanism controller each comprise position and velocity transducers.

7. A method for controlling a motion simulator seat for simulating vertical acceleration, comprising the steps of:

changing the pitch angle of a seat pan in accordance with said vertical acceleration while providing vertical movement at a rear of the seat pan; and displacing a seat back along a substantially vertical, linear path in accordance with said vertical acceleration at the same time as said seat pan position is changed, and providing a controlled relative movement between the rear of the seat pan and the seat back, whereby back scrubbing is controlled.

8. The method as claimed in claim 7, wherein said seat pan and said seat back are moved together with substantially a same displacement in response to said vertical acceleration.

9. The method as claimed in claim 7, wherein a pivot point of said seat pan is at a front thereof.

10. The method as claimed in claim 8, wherein a pivot point of said seat pan is at a front thereof.

\* \* \* \* \*